United States Patent
Eckardt et al.

(10) Patent No.: US 8,848,856 B2
(45) Date of Patent: Sep. 30, 2014

(54) METHOD FOR CATALYTIC RECOMBINATION OF HYDROGEN, WHICH IS CARRIED IN A GAS FLOW, WITH OXYGEN AND A RECOMBINATION SYSTEM FOR CARRYING OUT THE METHOD

(75) Inventors: Bernd Eckardt, Bruchköbel (DE); Robert Feuerbach, Kriftel (DE)

(73) Assignee: Areva GmbH, Erlangen (DE)

( * ) Notice: Subject to any disclaimer, the term of this patent is extended or adjusted under 35 U.S.C. 154(b) by 844 days.

(21) Appl. No.: 12/400,204

(22) Filed: Mar. 9, 2009

(65) Prior Publication Data

US 2009/0225927 A1    Sep. 10, 2009

(30) Foreign Application Priority Data

Mar. 7, 2008  (DE) .................. 10 2008 013 213

(51) Int. Cl.
*G21C 9/00* (2006.01)
*G21C 9/06* (2006.01)
*G21C 19/317* (2006.01)

(52) U.S. Cl.
CPC .............. *G21C 9/06* (2013.01); *G21Y 2004/30* (2013.01); *G21Y 2002/50* (2013.01); *G21Y 2002/206* (2013.01); *G21Y 2002/201* (2013.01); *G21Y 2002/207* (2013.01); *Y02E 30/40* (2013.01); *G21Y 2004/403* (2013.01); *G21C 19/317* (2013.01)
USPC ....................................................... 376/301

(58) Field of Classification Search
USPC .......... 376/277, 300, 301, 298, 299; 422/129, 422/187; 423/210, 248
See application file for complete search history.

(56) References Cited

U.S. PATENT DOCUMENTS

| 4,470,955 | A | * | 9/1984 | Collins et al. ................. | 422/159 |
| 5,198,405 | A | | 3/1993 | Chakraborty et al. | |
| 5,301,217 | A | | 4/1994 | Heck et al. | |
| 5,467,375 | A | * | 11/1995 | Sasaki ........................... | 376/300 |
| 2002/0076358 | A1 | * | 6/2002 | Eckardt et al. ................ | 422/105 |
| 2003/0161786 | A1 | * | 8/2003 | Eckardt ......................... | 423/659 |

FOREIGN PATENT DOCUMENTS

| DE | 2852019 | A1 | 6/1979 |
| DE | 4015228 | A1 | 11/1991 |
| EP | 0467110 | A1 | 1/1992 |
| JP | 59043396 | A | 3/1984 |
| JP | 60093998 | A | 5/1985 |
| JP | 3144400 | A | 6/1991 |
| JP | 7325193 | A | 12/1995 |

(Continued)

*Primary Examiner* — Timothy A Brainard
(74) *Attorney, Agent, or Firm* — Laurence A. Greenberg; Werner H. Stemer; Ralph E. Locher

(57) ABSTRACT

A method and a system for catalytic recombination of hydrogen, which is carried in a gas flow, with oxygen, has the gas flow passed through a reaction zone with a number of catalytic converter elements, with steam being added to the gas flow before it enters the reaction zone. The method and system ensure a particularly high operational reliability of the recombination device, even in varying operating conditions or with varying operating methods, in particular with regard to a hydrogen feed, which is provided as required, in the steam/feed water circuit of the installation. For this purpose, the feed rate of the steam to be added is adjusted in dependence on a measured value which is characteristic of a current actual temperature in the reaction zone.

14 Claims, 2 Drawing Sheets

(56) References Cited

FOREIGN PATENT DOCUMENTS

| | | |
|---|---|---|
| JP | 11248883 A | 9/1999 |
| JP | 20022526748 A | 8/2002 |
| JP | 2003302494 A | 10/2003 |
| WO | 9401870 A1 | 1/1994 |

\* cited by examiner

METHOD FOR CATALYTIC RECOMBINATION OF HYDROGEN, WHICH IS CARRIED IN A GAS FLOW, WITH OXYGEN AND A RECOMBINATION SYSTEM FOR CARRYING OUT THE METHOD

CROSS-REFERENCE TO RELATED APPLICATION

This application claims the priority, under 35 U.S.C. §119, of German application DE 10 2008 013 213.6-54, filed Mar. 7, 2008; the prior application is herewith incorporated by reference in its entirety.

BACKGROUND OF THE INVENTION

Field of the Invention

The invention relates to a method for catalytic recombination of hydrogen, which is carried in a gas flow, with oxygen, in which the gas flow is passed through a reaction zone with a number of catalytic converter elements, with steam being added to the gas flow before it enters the reaction zone. It also relates to a recombination system for catalytic recombination of hydrogen, which is carried in a gas flow, with oxygen, in which an inlet line, which is provided in order to supply the gas flow into a reaction zone which is formed by a number of catalytic converter elements, is connected to a steam supply line, in order to add steam as required.

In many technical installation, the operation, malfunctions or defects can lead to a release of combustible gases such as hydrogen, tritium or hydrocarbon compounds. For example, during operation of nuclear installations in nuclear power stations, particularly during power operation of the light-water reactors, so-called radiolytic splitting of water ($H_2O$) molecules takes place in the reactor radiation field, that is to say this leads to the formation of so-called radiolysis gases. Particularly in the case of boiling water reactor (BWR) installations, continuous radiolysis gas formation can also occur in the core area, with the radiolysis gases that are produced in this case, hydrogen and oxygen, being transported to the turbine condenser in the steam that is in the main circuit of the BWR installation. In addition to such continuous releases of hydrogen, and such releases of hydrogen resulting from operation, the release of hydrogen gas and carbon monoxide must be expected within the safety vessel or containment, which surrounds the reactor core, in the event of fault or accident situations in a nuclear installation, in which oxidation of zirconium can occur, for example as a result of core heating.

In this case, large amounts of hydrogen may be released, particularly after a fault involving coolant loss. Particularly during power operation of the installation, with radiolysis gases being formed continuously, the hydrogen that is produced may furthermore be enriched, for example in the area of the turbine condenser. As a result of which explosive gas mixtures occur within the containment or within the components in these operating or fault situations, with the enrichment of hydrogen in the respective atmosphere being possible to the extent that the integrity of the respective components could be endangered, particularly in the event of corresponding oxygen enrichment, in the case of accidental ignition by combustion of a relatively large amount of hydrogen since, at the start of the fault, the BWR containment is still reliably inerted over the first days.

Various devices or methods are discussed in order to prevent the formation of explosive gas mixtures in the containment, or in other components of a nuclear installation, as a result of processes such as these. By way of example, these include devices such as catalytic recombiners, catalytically and/or electrically operating ignition devices or the combination of the two above-mentioned devices as well as methods for permanent or subsequent inerting of the containment. In the case of BWR installations, use of systems such as these may in this case be envisaged in conjunction with continuous purging in the turbine condenser area, since the concentration of gases that require treatment occurs predominantly in the condenser areas.

When using a catalyst recombiner to remove the hydrogen from the atmosphere in the containment by its controlled oxidation with the assistance of a catalytic converter, the aim in particular is to achieve early and flameless recombination of the hydrogen with oxygen. In this case, a significant pressure buildup resulting from virulent hydrogen combustion should be reliably prevented. In order to allow this requirement to also be complied with safely with respect to the heat that is normally released as a result of the recombination or oxidation reaction, catalytic recombiners are normally configured exclusively for the conversion of gases with a comparatively low proportion of combustible gases considerably below the ignition limit, that is to say for example with a maximum proportion of the hydrogen carried therein of 4% by volume.

When using catalytic recombination systems such as these for gas processing in the area of the turbine condenser of a nuclear power station, purging is normally provided in the turbine condenser area. The gas flow, which has hydrogen in it and requires treatment, is in this case supplied from the turbine condenser via an inlet line to a suitable recombination device in which a recombination reaction of the hydrogen carried in the gas with oxygen to form water is initiated in a reaction zone with a number of suitable selected catalytic converter elements. In order to ensure comparatively high operational safety in this case, initial inerting of the gas flow which requires treatment is normally provided in systems such as these before the gas flow enters the recombiner device, with an inerting level, which is suitably high to prevent an explosive gas reaction, being achieved by suitable addition of steam to the gas flow. In gas processing systems such as these, provision is made for steam to be added to the gas flow, before it enters the reaction zone, for this purpose.

With regard to process-dependent fluctuations in the production rate of the radiolysis gases and other varying operating parameters, purging and gas treatment systems such as these are normally configured to ensure sufficiently high operational safety with sufficiently stringent safety margins, in particular relating to the intended proportion of steam in the gas flow after the steam addition. The feed rates of the dilution steam are in this case normally considerably greater than the actually expected requirement, particularly with regard to the stated stringent safety margins, with a hydrogen concentration in the gas flow being considerably less that that assumed for design purposes, in particular with regard to the fluctuating operating conditions, possibly in a large number of operating states. Furthermore, in the case of systems such as these, it must normally be accepted that the steam consumption will be considerably greater than the actual requirement. Because of the comparatively low hydrogen concentrations that occur, this large amount of steam consumption causes the recombination devices which are provided for gas processing to operate outside the actually expedient parameter ranges for reliable recombination operation.

Furthermore, in order to prevent or reduce corrosion effects and to ensure a comparatively homogeneous hydrogen concentration in the flow medium of the main circuit, gassing with hydrogen can be provided in a nuclear installation in order to achieve a "Hydrogened Water Chemistry" (HWC) process which, in the end, leads to an additional reduction in the amounts of radiolysis gases carried in the coolant, as a result of the achievable high degree of homogenization of the gas components. Measures such as these make it possible to reduce the rate of formation of hydrogen in the system and thus the hydrogen enrichment in the turbine condenser to values of considerably less than 10% of the originally assumed design proportions, with the result that, in systems such as these, the recombination device which is connected in the purging and gas treatment system operates only comparatively unreliably because of the low reaction temperatures which now occur, as a consequence of which the reaction kinetics are slowed down to a major extent and there are low process overheating margins.

SUMMARY OF THE INVENTION

It is accordingly an object of the invention to provide a method for catalytic recombination of hydrogen, which is carried in a gas flow, with oxygen, and a recombination system for carrying out the method which overcomes the abovementioned disadvantages of the prior art devices of this general type. The invention is therefore based on the object of specifying a method of the abovementioned type for catalytic recombination of hydrogen, which is carried in a gas flow, with oxygen, by which, even in the case of the operating conditions or ways of operation, which vary in this case, a particularly high operational reliability of the recombination device is ensured, particularly with regard to hydrogen feed which is provided as required in the primary circuit of the installation.

With the foregoing and other objects in view there is provided, in accordance with the invention, a method for catalytic recombination of hydrogen, being carried in a gas flow, with oxygen. The method includes the steps of adding steam to the gas flow before the gas flow enters a reaction zone, passing the gas flow through the reaction zone having a number of catalytic converter elements, and adjusting a feed rate of the steam to be added in dependence on a measured value being characteristic of a current actual temperature in the reaction zone.

With regard to the method, the object is achieved according to the invention in that steam is added to the gas flow before it enters the reaction zone, and with the feed rate of the steam to be added being adjusted in dependence on a measured value being characteristic of a current actual temperature in the reaction zone.

The invention is in this case based on the idea that, in order to ensure high operational reliability, the case of the maximum hydrogen release which can be expected is used as the basis for the configuration of a gas processing system of the stated type such that a sufficiently large amount of dilution steam is added in the systems that are normally provided, based on the maximum expected hydrogen release rate, such that, even in this extreme case, sufficiently high inerting of the gas flow supplied to the recombination unit is ensured. However, particularly with regard to the varying operating conditions and methods, this case corresponds to an extreme exceptional situation, as a result of which the added steam or dilution steam is fed to a considerably excessive extent to the system throughout the vast majority of the operating range of an installation such as this. Such overfeeding of this system with added steam, which goes well beyond the actual requirement, should, however, be avoided since, on the one hand, undesirably high steam consumption must be accepted as a result of such overfeeding and since, on the other hand, with such overfeeding, the proportion of hydrogen in the gas flow entering into the reaction zone in most operating situations of the installation is so low that the recombination unit operates outside its stable operating parameters, and therefore only unreliably. In order to counteract this, the addition of steam to the gas flow should be appropriate for the requirement and should be oriented on the actual current operating conditions.

When steam is added as required in this way, a particularly reliable functionality in the respective operating state of the recombination device which is provided for the recombination reaction should be provided as a design aim. Particularly with regard to the specific reaction conditions for the conversion of hydrogen and oxygen to water and with regard to the catalytic converter materials which are normally used, such as preferably platinum and/or palladium, the aim in this case should be to set an operating temperature range which is considered to be particularly advantageous in the reaction zone, preferably from about 300° C. to 600° C. In order to achieve this design aim, that is to say to set a temperature level which is particularly advantageous for the recombination reaction in the reaction zone, even when the hydrogen concentrations in the gas flow are varying, the steam feed or steam addition should be controlled or restricted via the temperature in the reaction zone.

In this case, the particularly desirable temperature level from about 300° C. to 600° C. in the reaction zone can be set, in particular, by preferably setting a hydrogen content in the gas flow flowing into the reaction zone to be about 3 to 8% by volume. The steam feed is therefore advantageously controlled or set such that a hydrogen concentration such as this occurs in the gas flow. However, in order to also guarantee sufficiently high operational safety in any case here as well, an additional or alternative advantageous refinement provides for the proportion of steam in the gas flow entering the reaction zone to be set to at least 70% by volume. This ensures adequate inerting of the gas flow flowing into the reaction zone in all circumstances.

In this case, the steam that is added can essentially be set on the basis of a suitable temperature characteristic value in the reaction zone as a reference variable. However, in order to allow the steam feed to be matched to the changing operating states to match the particular requirement, the setting of the steam flow to be added is in one advantageous refinement set taking account of a plurality of temperature characteristic values in the reaction zone and/or taking account of the time profile of one or more of the parameters. In this case, in particular, it is possible to take account of the temperature profile within the reaction zone or the temperature difference at its inlet and at its outlet. Furthermore, if the development of the parameters over time is taken into account in the form of a predictive setting, the system parameters can be readjusted in a particularly timely form. In this case, in particular, it is possible to take account of the inlet temperature and the outlet temperature in the reaction zone, a temperature difference determined from this, the pressure loss of the gas flow in the reaction zone, and/or the time profile of one or all of these parameters.

The addition of steam into the gas flow in dependence on the temperature in the reaction zone makes it possible to take particular account, in particular based on the requirement, of the varying operating conditions and states in the turbine condenser of a nuclear power station. The gas flow is therefore advantageously taken from the turbine condenser of a nuclear power station.

With regard to the recombination system, in which an inlet line, which is provided in order to supply the gas flow into a reaction zone which is formed by a number of catalytic converter elements is connected to a steam supply line, in order to add steam as required. The stated object is achieved in that a control unit, which is associated with a metering valve connected in the steam supply line, is connected on the data input side to a number of temperature sensors associated with the reaction zone.

The control unit is in this case advantageously in the form of a regulator unit with which a temperature value of the reaction zone is associated as a reference variable. In a further advantageous refinement, the control unit is provided with a data memory in which the determined measured values, that is to say in particular the temperature characteristic values and/or the pressure or partial pressure values, are stored and are kept available for subsequent evaluation of the time profile of the stated characteristic values.

The inlet line is in this case advantageously connected on the input side to the turbine condenser of a nuclear power station. Particularly in an arrangement such as this, the recombination system is actually also additionally suitable for use as an auxiliary installation, as required, for handling fault scenarios in the reactor safety vessel or containment. In order to allow this to be done in a particularly simple manner, in one particularly advantageous refinement, the inlet line is connected via a branch line to the safety vessel of the nuclear power station. Therefore, in the event of faults with hydrogen being released in the containment area, the recombination device can be used for oxidation or recombination of the amounts of hydrogen to be expected in the containment, or in principle also, by feeding in hydrogen, to produce or maintain containment inerting using nitrogen. In the case of use as required such at this, the recombination device is advantageously operated primarily in a sliding form on the circuit, on the respectively prevailing pressure level in the containment.

The advantages achieved by the invention are in particular that, the setting of the feed rate of the steam to be added as a function of the temperature in the reaction zone allows steam to be fed in in a manner which is particularly matched to the requirements, thus conserving resources. Specific steam feeding such as this thus also makes it possible to take account of the varying hydrogen proportions in the gas flow that requires treatment, in such a way that, even in normal operating conditions and in the operating mode in which hydrogen is injected (HWC mode) into the steam feed water circuit, a hydrogen concentration of preferably 3 to 6% by volume can be set at the inlet to the recombination zone on the basis of the amount of steam that is added being then correspondingly reduced. Even in the stated operating conditions, this therefore makes it possible to apply to the recombination device a hydrogen concentration which is particularly advantageous for the recombination reaction, and thus to maintain operating conditions which are particularly advantageous for the recombination reaction. In this case, in comparison to conventional installations, it is possible to achieve a saving in the amount of dilution steam or the amount of propellant steam by a factor of up to 10, and a significant reduction in the operating costs associated with this. Furthermore, with regard to the reduced amounts of steam, it is possible to achieve a reduction in the pipelines and other components that are used, with the life of the components that are used furthermore still being increased by the comparatively lower mechanical loads.

This method and the device therefore allow and introduce a highly effective "Efficiency Controlled Recombination Process Technology", referred to for short as ECO REC technology.

Other features which are considered as characteristic for the invention are set forth in the appended claims.

Although the invention is illustrated and described herein as embodied in a method for catalytic recombination of hydrogen, which is carried in a gas flow, with oxygen, and a recombination system for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
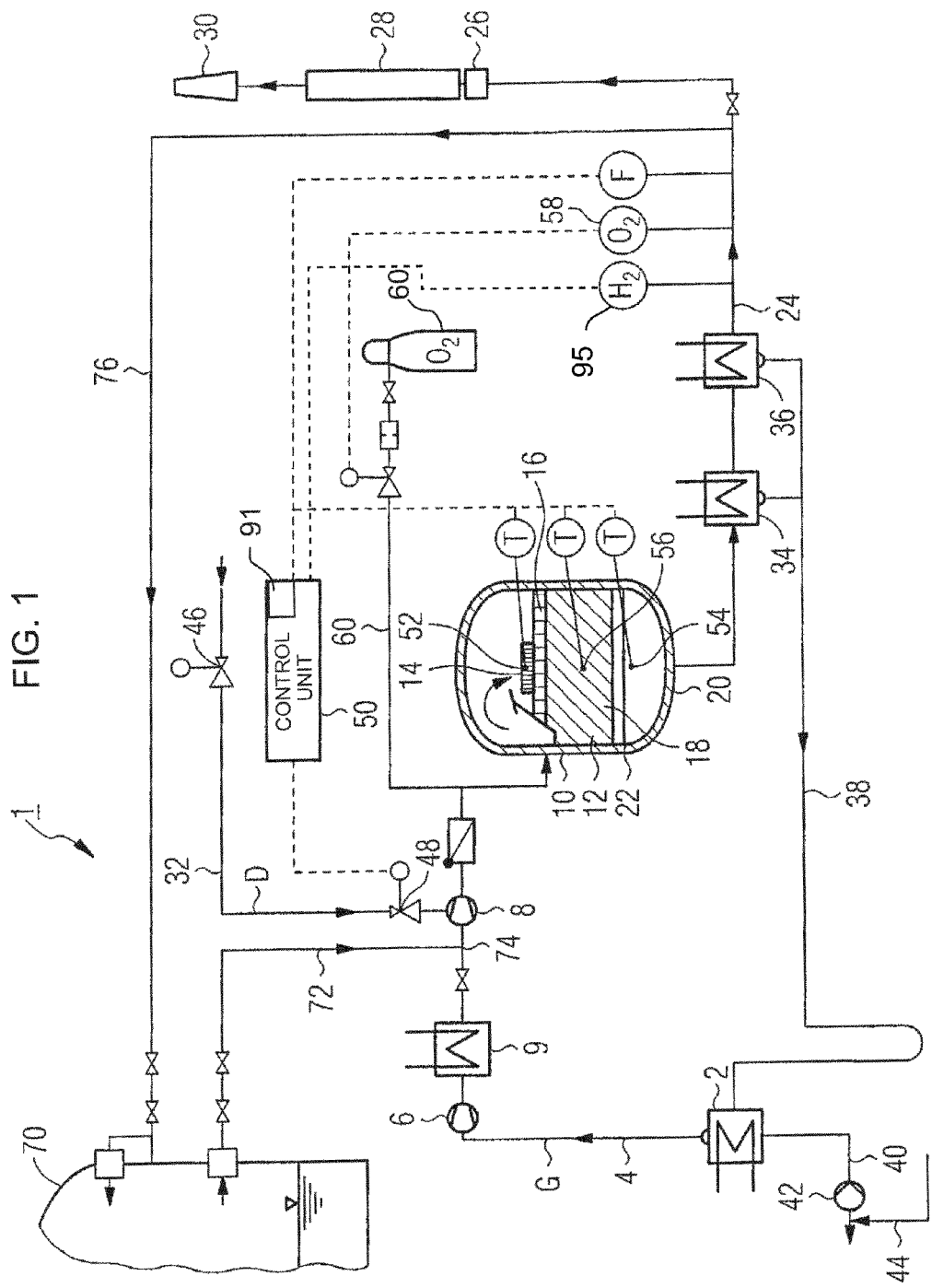
FIG. 1 is a diagrammatic, illustration of a recombination system for catalytic recombination of hydrogen, which is carried in a gas flow, with oxygen, according to the invention.

Identical parts are provided with the same reference symbols in the two figures. Referring now to the figures of the drawing in detail and first, particularly, to FIG. 1 thereof, there is shown a recombination system 1 that is configured for catalytic recombination of a combustible gas, that is to say hydrogen in the exemplary embodiment. In the exemplary embodiment, the recombination system 1 is in this case intended for gas processing or treatment for a turbine condenser 2 of a nuclear power station. For this purpose, an inlet line 4 of the recombination system 1 is connected on an input side, in the form of a purging system, to the turbine condenser 2 of the nuclear power station. On an output side, the inlet line 4 into which a primary compressor 6 and a secondary compressor 8 are connected in order to feed the gas flow G which requires treatment, is connected to a recombination unit 10.

The recombination unit 10 is in this case configured for the actual catalytic recombination reaction in order to remove hydrogen which is carried in the gas flow G. For this purpose, a reaction zone 12 is provided within the recombination unit 10, and is formed by a number of catalytic converter elements. In this case, the catalytic converter elements may be configured in different ways in embodiments which are known per se, in which case, in particular, it is possible to use a configuration as plate or film catalytic converters, or else as a catalytic converter filling. In the exemplary embodiment, a first catalytic converter 14 is provided in the reaction zone 12, formed from suitable selected plate elements composed of palladium and/or platinum, preferably as a washcoat on metallic supporting bodies, which is arranged via a flow distribution and alignment system 16 on a catalytic converter filling 18, once again based on platinum and/or palladium. In order to promote suitable reaction conditions, an outer casing 20, which surrounds the reaction zone 12, of the recombination unit 10 is provided with casing heating 22.

On the output side, the recombination unit 10 is connected to an outlet line 24, via which the treated and processed gas flow can be carried away. The outlet line 24 in this case opens in an off-gas chimney 30 via a drying device 26 and a deceleration path 28, preferably based on activated charcoal.

In order to ensure a particularly high level of operational safety in the recombination of the hydrogen fraction in the gas flow G, the recombination system 1 is configured such that the recombination reaction can be carried out in inert conditions, and thus precluding any risk of explosion. To this end, the addition of steam is envisaged as a measure for making the gas flow G inert before it enters the recombination unit 10. In order to add steam D as required, the inlet line 4 is in this case connected to a steam supply line 32. In order to recover the steam D that is fed in in this case on the output side of the recombination unit 10 and in order to make it available as water once again to the installation process, a number of condensers 34, 36 are connected in the outlet line 24, in which the steam component which is carried in the treated gas flow is condensed to form water. On the water side, the condensers 34, 36 are connected via a return flow line 38 to the turbine condenser 2. The water which is fed back in this way via the return flow line 38 into the turbine condenser 2 is passed from this into the primary circuit of the nuclear power station, which is indicated in FIG. 1 by a feed water line 40 and a feed water pump 42.

The recombination system 1 is configured for particularly high operational reliability of the recombination device 10 even in varying operating conditions and with varying hydrogen fractions in the gas flow G which requires treatment. This takes particular account of the fact that a fluctuating release of hydrogen as a radiolysis gas can be expected in the turbine condenser 2 as a result of varying operating conditions during regular operation. Furthermore, this takes account of the fact that the nuclear power station in the exemplary embodiment is configured, based on requirement or regularly, with a hydrogen feed in the primary circuit, as is indicated by the feed line 44, by which the corrosion resistance of the overall system is increased and the overall hydrogen rates that can be observed can be reduced as a result of the greater homogenization that can be achieved in the primary coolant. In order to correspondingly also ensure adequately high catalytic activity in the recombination device 10 at the comparatively low hydrogen rates that can normally be expected, and thus to ensure particularly high operational reliability, the recombination system 1 is configured for steam to be added to the gas flow G as required and depending on the situation.

In this case, a first intermediate station 46 is connected in the steam supply line 32, via which a pressure of preferably more than five to ten times the critical pressure at the Laval velocity is set in the downstream section of the steam supply line 32. A further pressure reducing device, which can be regulated, or a metering valve 48, which can be regulated, is then connected in the steam supply line 32. The metering valve 48, which can be regulated or can be controlled, is in this case driven via an associated control unit 50. This configuration results in the gases being purged from the turbine condenser 2 by steam jet pumps in the form of compressors 6, 8 with the gas flow G simultaneously being diluted with steam, with the final compression stage, seen in the flow direction, that is to say the compressor 8, being in the form of a regulated steam jet stage. The propellant steam in the propellant nozzle inlet is kept above the critical pressure ratio over a wide operating range by suitably driving the metering valve 48 in this steam jet stage. The jet inlet pressure range of this stage is in this case chosen to be at least sufficiently high that the critical pressure ratio is exceeded by a factor of 3 to a factor of 10 with respect to a downsteam pressure of about 1 bar. In particular, this ensures that, even in the case of a major intermediate restriction in the jet pump propellant nozzle, the advantageous Laval velocity is always ensured, with a correspondingly advantageous feed capability for the gas flow. By way of example, with an intermediate restriction of 15 bar to about 2 bar, the amount of steam can be reduced by factor of more than 7 while nevertheless still achieving the high velocities, up to the Laval velocity, which are important for feed purposes, with an expansion to 1 bar in the nozzle.

For the addition of steam in particular as required even in varying operating conditions, the recombination system 1 is configured with the design aim of operating the catalytic converter elements in the reaction zone 12 largely in a temperature range of, for example, between 300° C. and 600° C., which is particularly advantageous for the recombination reaction. In order to make this possible, provision is specifically made for a suitable amount of steam to be added into the gas flow G such that the desired temperatures are achieved in the reaction zone as a consequence of the resultant mixing and concentration ratios. In order to make this possible, the control unit 50 is in the form of a regulator unit with a temperature value of the reaction zone 12 as a reference variable and, on the data input side, is connected to a number of temperature sensors 52, 54, 56 which are associated with the reaction zone 12. In this case, a first temperature sensor 52 is arranged in the gas inlet area of the reaction zone 12, and a second temperature sensor 54 is arranged in the gas outlet area of the reaction zone 12. A third temperature sensor 56 is, in contrast, arranged in the interior of the reaction zone 12.

The measured values provided by the temperature sensors 52, 54, 56 therefore make it possible to take account of suitable temperature characteristic values in order to ensure the desired temperature level for the steam feed. Furthermore, other parameters such as temperature profiles or else the time response of the individual temperature characteristic values, or else the difference temperature between the gas inlet and the gas outlet, can also be evaluated and taken into account in a suitable form. Furthermore, the control unit 50 is provided with a data memory 91, such that the measurement values can be suitably temporarily stored and can be evaluated further as required.

For further system monitoring, further sensors, in particular material sensors, are connected to the individual lines, in particular to the outlet line 24. In this case, by way of example, an oxygen sensor 58 can be used to detect a lack of oxygen in the off-gas flow, which can be compensated for in a suitable form, as required, via a feed run 60 for oxygen. A hydrogen sensor 95 is additionally connected between the outlet line 24 and the control unit 50.

Furthermore, the control unit 50 is configured to ensure adequate inerting of the gas flow G, before it enters the recombination unit 10, during every situation during operation. To this end, the control unit 50 is configured to set the feed rate of the steam D to be added such that the gas flow G has a steam content of at least 70% by volume when it enters the reaction zone 12.

The recombination system 1 is therefore configured for particularly flexible addition of steam as required into the gas flow G, thus ensuring reliable gas treatment of the gas purged from the turbine condenser 2. Furthermore, however, the recombination system 1 is also configured for connection as required during the treatment of fault scenarios in which hydrogen is released in the safety vessel or containment 70 of the nuclear installation. To this end, the inlet line 4 of the recombination system 1 is connected to the containment 70 via a branch line 72, which opens into the inlet line 4 at a feed point 74. In a fault scenario such as this, in which a medium which requires treatment is fed into the recombination device 10 via the branch line 72, an operating mode is envisaged essentially in the equal-pressure mode at a pressure in the circuit which corresponds to the respectively prevailing containment pressure level. To this end, a return line 76 is connected to the outlet line 24, via which return line 76 circulating operation can be produced, in exchange with containment 70, when required.

Figure 2:
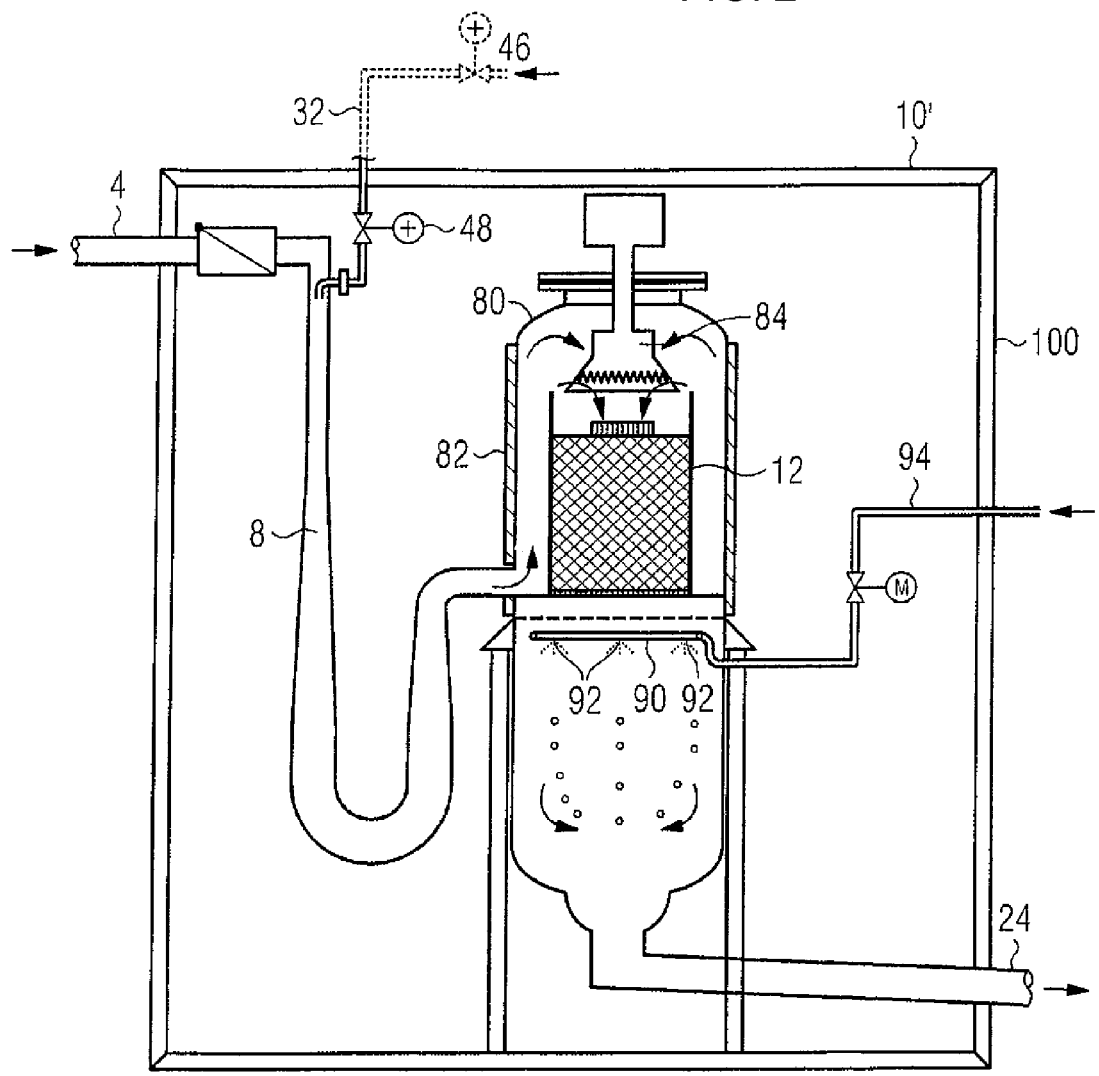
FIG. 2 is a diagrammatic, illustration of a recombination unit for the recombination system shown in FIG. 1.

FIG. 2 shows one alternative embodiment of the recombiner device 10. In this case, in one particularly advantageous refinement, the reaction zone 12 is arranged within an inner casing, which is integrated in an outer casing 82. The inlet area between the reaction zone 12 and the outer casing is heated by a heating device which is fitted directly to the outer casing 82, such that the desired temperatures can be maintained. Furthermore, an additional heater 84 is provided in the inlet area for the gas flow G. In the exemplary embodiment shown in FIG. 2, the reaction zone 12 is followed by a spray system 90 with a number of spray nozzles 92, to which cooling water can be supplied via a supply line 94. The spray system 90 can thus be used for injection cooling or spray cooling of the gas flow flowing out of the reaction zone 12, thus allowing recooling of the treated gas flow even without downstream condensers. An arrangement such as this thus allows a particularly compact construction within a frame structure 100 such that it is possible to retrofit existing installations, in particular even when very little space is available. The separation of the pressure vessel casing 82 from the reaction zone 12 by an annular gap and the direct subsequent spray cooling furthermore result in the high temperatures in the reaction zone 12 being decoupled from the pressurized outer area, thus also allowing reaction temperatures of more than 500° C.—without any direct effects on the materials, including the limiting characteristic data of the pressurized part. In addition, recuperative gas heating by the high-temperature section and casing outer heating is provided in the system shown in FIG. 2.

The invention claimed is:

1. A method for catalytic recombination of hydrogen, being carried in a gas flow, with oxygen, which comprises the steps of:
    adding steam to the gas flow before the gas flow enters a reaction zone;
    passing the gas flow through the reaction zone having a number of catalytic converter elements; and
    adjusting a feed rate of the steam to be added in dependence on a measured value being characteristic of a current actual temperature in the reaction zone.

2. The method according to claim 1, which further comprises adjusting the feed rate of the steam to be added such that the gas flow has a steam content of at least 70% by volume when the gas flow enters the reaction zone.

3. The method according to claim 1, which further comprises adjusting the feed rate of the steam to be added such that the gas flow has a hydrogen content of between 3 and 8% by volume when the gas flow enters the reaction zone.

4. The method according to claim 1, which further comprises adjusting the feed rate of the steam to be added in dependence on measured values which are characteristic of a plurality of current actual temperatures in the reaction zone.

5. The method according to claim 4, which further comprises adjusting the feed rate of the steam to be added in dependence on a development of the measured values over time.

6. The method according to claim 4, which further comprises providing at least one current actual inlet temperature and one current actual outlet temperature of the reaction zone as the measured values.

7. The method according to claim 1, which further comprises adjusting the feed rate of the steam to be added in dependence on a further measured value being characteristic of a current pressure loss in the reaction zone.

8. The method according to claim 1, which further comprises taking the gas flow from a turbine condenser of a nuclear power station.

9. A recombination system for catalytic recombination of hydrogen being carried in a gas flow, with oxygen, the recombination system comprising:
    a reaction zone having a number of catalytic converter elements;
    a steam supply line;
    an inlet line for supplying the gas flow into said reaction zone and connected to said steam supply line for adding steam as required;
    a metering valve connected in said steam supply line;
    a number of temperature sensors associated with said reaction zone; and
    a control unit controlling said metering valve and having a data input side connected to said number of temperature sensors, said control unit controlling said metering valve for adjusting a flow of the steam in dependence on values derived from said temperature sensors.

10. The recombination system according to claim 9, wherein said control unit is a regulator unit with a temperature value of said reaction zone as a reference variable.

11. The recombination system according to claim 9, wherein said control unit has a data memory.

12. The recombination system according to claim 9, wherein said inlet line has an inlet side connected to a turbine condenser of a nuclear power station.

13. The recombination system according to claim 12, wherein said inlet line has a branch line connected to a safety vessel of the nuclear power station.

14. The recombination system according to claim 9, further comprising:
    a compressor disposed along said steam supply; and
    a steam jet pump disposed along said inlet line, said steam supply line is connected to said steam jet pump for providing a propellant steam pressure that can be regulated, and, after said compressor the propellant steam pressure is more than five to ten times a steam jet pump outlet pressure.

* * * * *